(12) United States Patent
    Cannon

(10) Patent No.: US 12,623,734 B2
(45) Date of Patent: May 12, 2026

(54) ELECTRIC VEHICLE AND BALANCING OF AN ELECTRIC VEHICLE

(71) Applicant: AUDI AG, Ingolstadt (DE)

(72) Inventor: Shane Cannon, Beilngries (DE)

(73) Assignee: Audi AG, Ingolstadt (DE)

( * ) Notice: Subject to any disclaimer, the term of this patent is extended or adjusted under 35 U.S.C. 154(b) by 170 days.

(21) Appl. No.: 18/319,382

(22) Filed: May 17, 2023

(65) Prior Publication Data

US 2023/0382472 A1      Nov. 30, 2023

(30) Foreign Application Priority Data

May 25, 2022    (DE) ..................... 10 2022 113 197.1

(51) Int. Cl.
    *B62D 37/00*       (2006.01)
    *B60K 1/04*        (2019.01)
    *B60L 50/60*       (2019.01)
    *B62D 37/04*       (2006.01)
    *H01M 50/249*      (2021.01)

(52) U.S. Cl.
    CPC ................ *B62D 37/04* (2013.01); *B60K 1/04* (2013.01); *B60L 50/66* (2019.02); *H01M 50/249* (2021.01); *B60L 2200/12* (2013.01); *B60L 2250/00* (2013.01); *H01M 2220/20* (2013.01)

(58) Field of Classification Search
    CPC ..... B62D 37/04; B60L 50/66; B60L 2200/12; B60L 2250/00; H01M 50/249; H01M 2220/20; B60K 1/04
    USPC .......................................................... 701/2
    See application file for complete search history.

(56) References Cited

U.S. PATENT DOCUMENTS

| | | | | |
|---|---|---|---|---|
| 11,639,092 B1* | 5/2023 | Wright | .................... | B60L 15/20 |
| | | | | 180/65.8 |
| 2015/0203162 A1* | 7/2015 | Suzuki | .................... | B60L 50/66 |
| | | | | 180/274 |
| 2016/0204401 A1* | 7/2016 | Curtis | ................. | H01M 50/209 |
| | | | | 429/153 |
| 2017/0050685 A1 | 2/2017 | Seo | | |
| 2017/0259693 A1* | 9/2017 | Kirk | .................... | H01M 50/249 |
| 2018/0009450 A1* | 1/2018 | Shaw | ....................... | B60K 1/04 |

FOREIGN PATENT DOCUMENTS

| | | | | |
|---|---|---|---|---|
| CN | 111845970 A | 10/2020 | | |
| DE | 102011105494 A1 * | 12/2012 | ........... | B60R 21/013 |
| DE | 102012007875 A1 | 10/2013 | | |
| DE | 102015120413 A1 | 2/2017 | | |
| DE | 102016225997 A1 | 6/2018 | | |
| DE | 102020104866 B3 * | 8/2021 | | |
| KR | 1998-0034938 A | 8/1998 | | |

(Continued)

OTHER PUBLICATIONS

English Translation for DE-102020104866-B3. (Year: 2025).*

(Continued)

*Primary Examiner* — Mahmoud S Ismail

(74) *Attorney, Agent, or Firm* — Seed Intellectual Property Law Group LLP

(57) ABSTRACT

A method for balancing an electric vehicle is provided, in which a controller of an electric vehicle variably adjusts the disposition of a bracket with battery modules of a traction battery of the electric vehicle situated in the bracket relative to a chassis of the electric vehicle. An electric vehicle is also provided.

10 Claims, 2 Drawing Sheets

(56) References Cited

FOREIGN PATENT DOCUMENTS

| | | | |
|---|---|---|---|
| KR | 19990047673 | A | 7/1999 |
| WO | WO 2018009442 | A1 | 1/2018 |

OTHER PUBLICATIONS

English Translation for DE-102011105494-A1. (Year: 2025).*
Office Action, dated Jan. 1, 2023, for German Patent Application
No. 10 2022 113 197.1 (6 pages).

* cited by examiner

ELECTRIC VEHICLE AND BALANCING OF AN ELECTRIC VEHICLE

BACKGROUND

Technical Field

Embodiments of the present disclosure relate to a method for balancing an electric vehicle, in which a controller of an electric vehicle variably adjusts the disposition of a bracket and battery modules of a traction battery of the electric vehicle situated in the bracket relative to a chassis of the electric vehicle. Additionally, embodiments relate to an electric vehicle.

Description of the Related Art

Methods of the mentioned kind in various configurations belong to the prior art and serve for varying the balance of an electric vehicle. By the balance is generally meant the distribution of an overall force, exerted by the electric vehicle on the ground, over the individual wheels of the electric vehicle. The balance has a static component, which results as a distribution of a weight force, i.e., a weight distribution, of the electric vehicle from a distribution of the total weight of the electric vehicle, and a dynamic component, which results from each acceleration of the electric vehicle.

The weight of a traction battery of the electric vehicle is a significant part of the overall weight of the electric vehicle. Accordingly, the balance of the electric vehicle is heavily dependent on the disposition of the traction battery of the electric vehicle relative to the chassis of the electric vehicle. The disposition may involve the relative position of the traction battery and/or the relative orientation of the traction battery.

The traction battery usually comprises a bracket and a plurality of battery modules, which are situated in the bracket. The disposition of the traction battery can be adjusted variably by moving the bracket of the traction battery relative to the chassis, whereupon the moving of the bracket necessarily causes the moving of battery modules situated in the bracket.

Each passenger located in the vehicle has a weight, which influences the weight distribution and consequently the static component of the balance of the electric vehicle.

Thus, the document DE 10 2015 120 413 A1 discloses a chassis and a bracket for a traction battery of an electric vehicle. A controller variably adjusts the position of the bracket relative to the chassis depending on the weight of a passenger of the vehicle, as detected by sensors.

The electric vehicle can have dedicated sensors, which detect the balance of the electric vehicle and especially its dynamic component in real time.

The document KR 1998 0034938 A discloses a chassis and a bracket for a traction battery of an electric vehicle. A controller adjusts the position of the bracket with respect to an x-direction of the electric vehicle relative to the chassis depending on a sensor signal provided by a balance sensor.

The document KR 1999 0047673 A discloses another chassis and a bracket for a traction battery of an electric vehicle. A controller adjusts the position of the bracket with respect to a y-direction of the electric vehicle relative to the chassis depending in order to reduce the roll of the electric vehicle depending on a driving state of the electric vehicle.

As usual, the x-direction is defined as the front-rear direction of the electric vehicle and the y-direction as the left-right direction of the electric vehicle and the z-direction is defined as the top-bottom direction of the electric vehicle, the x-direction, the y-direction, and the z-direction defining a right-handed Cartesian coordinate system.

However, the solutions presented above for the balancing of an electric vehicle are limited in terms of their flexibility and variability.

BRIEF SUMMARY

Embodiments may provide an electric vehicle and a method for balancing an electric vehicle which has great flexibility and great variability.

Some embodiments include a method for balancing an electric vehicle, in which a controller of an electric vehicle variably adjusts the disposition of a bracket and battery modules of a traction battery of the electric vehicle situated in the bracket relative to a chassis of the electric vehicle. Thanks to adjusting the disposition, an overall force exerted by the electric vehicle on the ground is varied with respect to a distribution over the wheels of the electric vehicle. The disposition comprises a relative position and/or a relative orientation of the traction battery. The controller defines the variation of the distribution.

In some embodiments, a human-machine interface of the electric vehicle detects the input of a passenger of the electric vehicle and sends a demand signal dependent on the detected input to the controller, the controller receives the demand signal that was sent, and the controller adjusts the disposition of the bracket depending on the received demand signal. The human-machine interface can make it possible for the passenger, especially the driver of the electric vehicle, to influence the balance of the electric vehicle at any time according to choice, thereby increasing the flexibility of the balancing method. Likewise, the human-machine interface can make it possible for the passenger to arbitrarily influence the degrees of freedom of the adjustment, thereby increasing the variability of the balancing method.

In one embodiment, the human-machine interface detects the disposition as the input or the human-machine interface detects a type of operation of the electric vehicle determining the disposition as the input. The passenger can directly enter the disposition of the traction battery. Alternatively, or additionally, the passenger can enter the disposition of the traction battery indirectly as the kind of operation, if the controller defines a dependency of the disposition of the traction battery.

The kind of operation can include, for example, a "stable mode," a "balanced mode," and an "agile mode." In the stable mode, front wheels of the electric vehicle can apply 55% and rear wheels of the electric vehicle 45% of the static component of the balance to the ground beneath the electric vehicle. The bracket in the stable mode is shifted forward and/or downward.

In the balanced mode, the front wheels of the electric vehicle and the rear wheels of the electric vehicle can each apply 50% of the static component of the balance to the ground underneath the electric vehicle. The bracket in the balanced mode is situated centrally in regard to the y-direction and/or the z-direction.

In the agile mode, the front wheels of the electric vehicle can apply 45% and rear wheels of the electric vehicle 55% of the static component of the balance to the ground beneath the electric vehicle. The bracket in the agile mode is shifted backward and/or upward.

The variable adjustment can involve a shifting of the bracket in an x-direction of the electric vehicle, in a y-direction of the electric vehicle, and/or in a z-direction of the electric vehicle. The variable adjustment is done by a pure translation movement of the bracket. The translation movement can occur along any customary vehicle direction or along any desired direction which is a linear combination of the customary vehicle directions.

Alternatively, or additionally, the variable adjustment can involve a swiveling of the bracket about an x-axis extending in an x-direction of the electric vehicle, about a y-axis extending in a y-direction of the electric vehicle, and/or about a z-axis extending in a z-direction of the electric vehicle. The variable adjustment is done by a pure rotation movement of the bracket. The rotation movement can occur along any customary vehicle direction as the axis of rotation or along any desired axis of rotation extending in parallel with a linear combination of the customary vehicle directions. Of course, the position of the axis of rotation can also be adjusted relative to the chassis and/or to the bracket.

In this way, the method provides up to six external degrees of freedom for the adjusting of the disposition of the traction battery relative to the chassis. The relative disposition of the battery module within the traction battery remains constant during these adjustments, i.e., the structure of the bracket and the overall shape of the traction battery are not changed.

Alternatively, or additionally, the variable adjustment can involve a stacking of the battery modules in relation to a z-direction of the electric vehicle or a winding up of the bracket with the battery modules situated in the bracket about a winding axis extending in the y-direction of the electric vehicle. The stacking and the winding each change the structure of the bracket and the overall shape of the traction battery and makes use of internal degrees of freedom of the traction battery. The internal degrees of freedom further increase the variability of the balancing method.

In some embodiments, the controller activates an actuator and the activated actuator moves the bracket relative to the chassis. Each degree of freedom is associated with at least one actuator, such as an electric motor. To activate the actuator, the controller sends a control signal to the actuator. The actuator receives the control signal which is sent and moves the bracket depending on the control signal received.

The controller may adjust the disposition of the bracket depending on the acceleration of the electric vehicle and/or in order to influence a trajectory of the electric vehicle. The acceleration-dependent adjustment can be called reactive or passive, and the influencing adjustment can be called active. The acceleration-dependent adjustment of the disposition and the adjustment of the disposition influencing the trajectory pertain to the dynamic component of the balancing, which the controller can undertake in real time and automatically on the basis of the passenger input.

For example, the bracket can be shifted backward upon braking, and the bracket can be shifted forward when gas is applied. Likewise, during a lefthand curve the bracket can be shifted to the left, and during a righthand curve the bracket can be shifted to the right. Furthermore, the bracket can be shifted downward during each curve, in order to lower the center of gravity of the electric vehicle.

In similar manner, the bracket can be shifted predictively in dependence on an immediately upcoming course of the trajectory of the electric vehicle. The electric vehicle can determine the immediately upcoming course of the trajectory by a GPS receiver and a navigation system. Of course, an automatic swiveling of the bracket can also be done in real time or predictively. Alternatively, or additionally, the bracket can be shifted or swiveled in dependence on the condition of a roadway being traveled by the electric vehicle as detected in particular by a forward-directed exterior camera of the electric vehicle or received from a stationary traffic server.

Some embodiments of the method described herein may cooperate with known static and/or dynamic trimming methods for the chassis of electric vehicles, involving for example, pneumatic springs.

Some embodiments include an electric vehicle, comprising a chassis and a bracket mounted on the chassis and movable relative to the chassis, battery modules of a traction battery of the electric vehicle situated in the bracket, a controller for variable adjusting of a disposition of the bracket relative to the chassis, and a human-machine interface functionally connected to the controller for detecting the input of a passenger of the electric vehicle. Such electric vehicles are widespread and an increasing in popularity. Accordingly, numerous application possibilities exist for embodiments of the disclosure.

In some embodiments, the electric vehicle is configured to carry out a method described herein. The controller and the human-machine interface must be functionally connected in order to carry out the method.

The electric vehicle may be configured as a passenger car or a motorcycle. Passenger cars and motorcycles are especially relevant configurations of the electric vehicle on account their broad and increasing popularity.

The human-machine interface may be configured as an infotainment system of the electric vehicle or as a mobile terminal device connected to the electric vehicle. The infotainment system comprises a touch-sensitive display screen (Central Information Display, CID) and is functionally connected to the controller by a hard-wired vehicle bus system. The mobile terminal device can be configured as a smartphone and is coupled wirelessly, i.e., functionally connected to the electric vehicle, for example, by a Bluetooth connection or a W-LAN connection. The smartphone can have an app for detecting the input of the passenger regarding a balancing of the electric vehicle, which sends the demand signal via the wireless connection to the controller.

One major benefit of the method is that it has a large flexibility, i.e., an influencing of the vehicle by the passenger, and makes possible a large variability, i.e., a diversity of adjustment possibilities.

BRIEF DESCRIPTION OF THE SEVERAL VIEWS OF THE DRAWINGS

Embodiments of the disclosure are presented schematically with the aid of the drawings and shall be further described with reference to the drawings.

DETAILED DESCRIPTION

Figure 1:
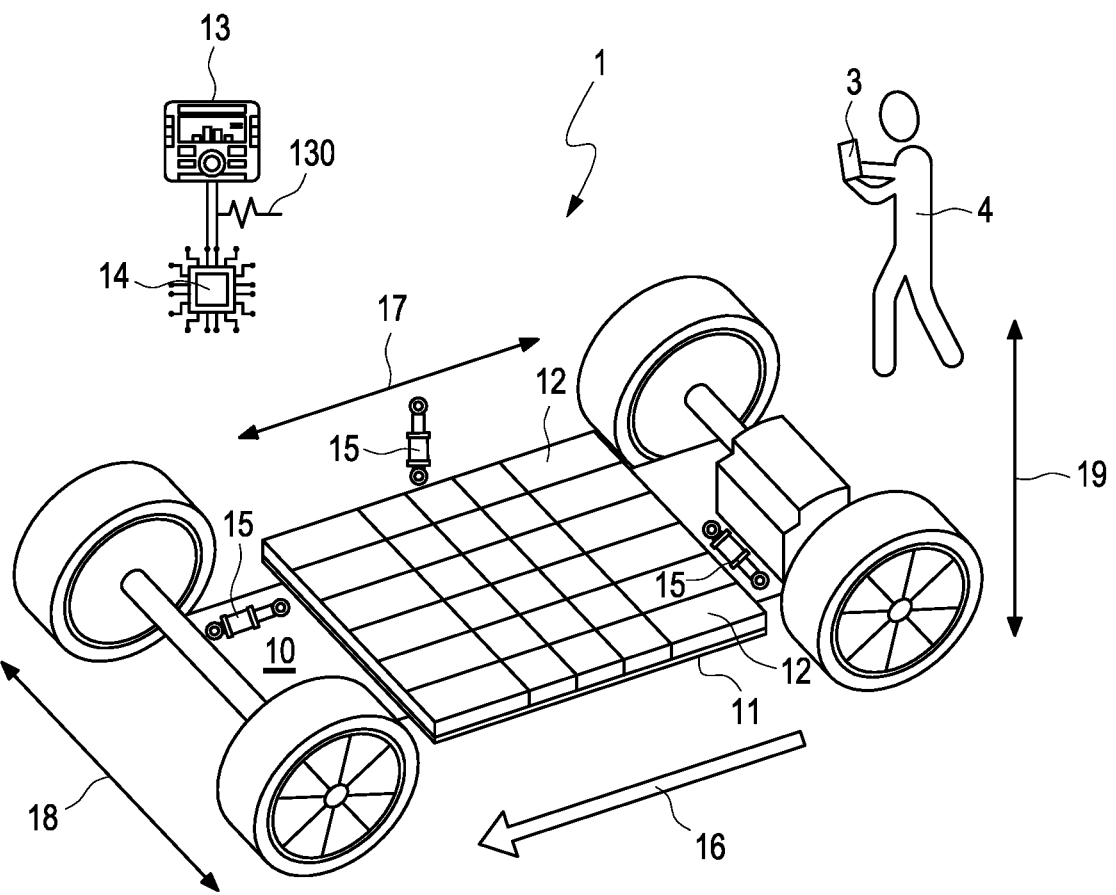
FIG. 1 shows in a perspective view, an electric vehicle according to a first embodiment of the disclosure.

FIG. 1 shows a lateral cross sectional view of an electric vehicle 1 according to a first embodiment of the disclosure. The electric vehicle 1 is configured as a passenger car and it comprises a chassis 10 and a bracket 11 mounted on the chassis 10 and movable relative to the chassis 10.

Moreover, the electric vehicle 1 comprises battery modules 12 of a traction battery of the electric vehicle 1 situated in the bracket 11, a controller 14 for the variable adjustment of the disposition of the bracket 11 relative to the chassis 10, and a human-machine interface 13 functionally connected to the controller 14 for detecting the input of a passenger 4 of the electric vehicle 1.

The electric vehicle 1 may also include an actuator 15 for moving the bracket 11. The actuator 15 is functionally connected to the controller 14 and configured to activate the functionally connected actuator 15 in order to move the bracket 11. The human-machine interface 13 can be formed as an infotainment system of the electric vehicle 1 or as a mobile terminal device 3 connected to the electric vehicle.

In some embodiments, the electric vehicle 1 comprises a plurality of actuators 15, each being associated with one displacement direction or one swivel axis of the bracket 11 and designed to shift the bracket 11 in the associated displacement direction, i.e., in an x-direction 17, a y-direction 18 or a z-direction 19, or to swivel it about the associated swivel axis, i.e., an x-axis 20, a y-axis 21 or a z-axis 22.

The electric vehicle 1 is configured to carry out a method described herein for the balancing of the electric vehicle.

The human-machine interface 13 of the electric vehicle 1 detects an input of the passenger 4 of the electric vehicle 1 and sends a demand signal 130 to the controller 14, dependent on the input so detected. The human-machine interface 13 can detect the disposition as the input. Alternatively, the human-machine interface 13 can detect the kind of operation of the electric vehicle 1 determining the disposition as the input.

The controller 14 of the electric vehicle 1 receives the demand signal 130 that was sent and adjusts variably the disposition of the bracket 11 and the battery modules 12 of the traction battery of the electric vehicle 1 situated in the bracket 11 relative to the chassis 10 of the electric vehicle 1 depending on the demand signal 130 received. In some embodiments, the controller 14 activates one or more actuators 15. The activated actuator(s) 15 move the bracket 11 relative to the chassis 10.

The variable adjustment can involve a shifting of the bracket 11 in the x-direction 17 of the electric vehicle 1, 2, in the y-direction 18 of the electric vehicle 1, 2, and/or in the z-direction 19 of the electric vehicle 1, 2.

The controller 14 may adjust the disposition of the bracket 11 depending on the acceleration of the electric vehicle 1, 2 and/or in order to influence a trajectory 16 of the electric vehicle 1, 2.

Figure 2:
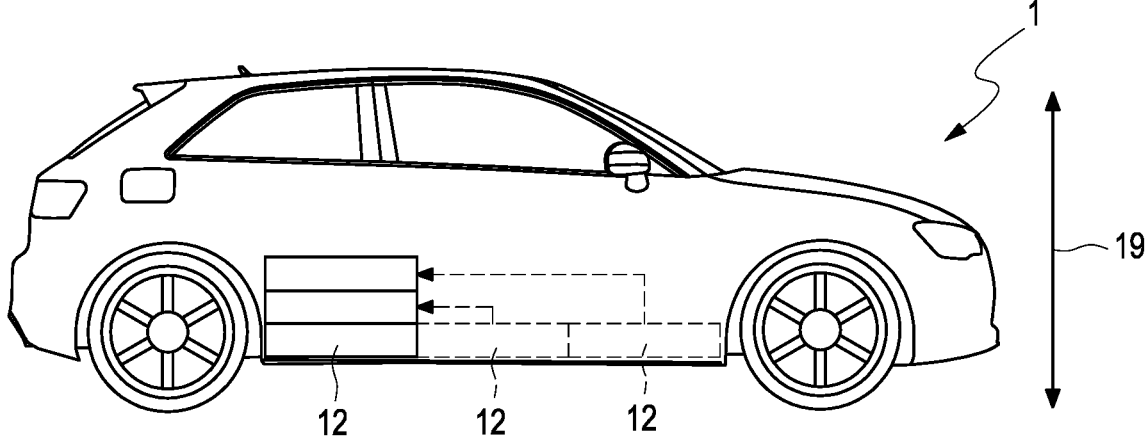
FIG. 2 shows in a lateral view, an electric vehicle according to a second embodiment of the disclosure.

FIG. 2 shows in a lateral view an electric vehicle 1 according to a second embodiment of the disclosure. In the electric vehicle 1 of FIG. 2, the variable adjustment involves a stacking of the battery modules 12 in relation to the z-direction 19 of the electric vehicle 1.

Figure 3:
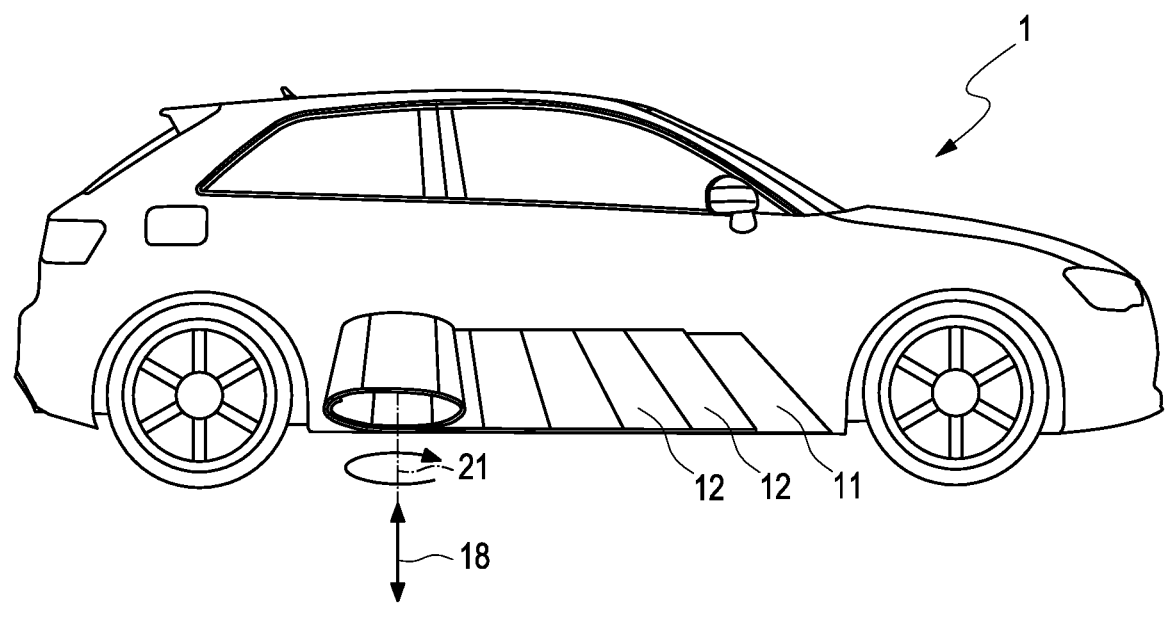
FIG. 3 shows in a lateral view, an electric vehicle according to a third embodiment of the disclosure.

FIG. 3 shows in a lateral view an electric vehicle 1 according to a third embodiment of the disclosure. In the electric vehicle 1 of FIG. 3, the variable adjustment involves a winding up of the bracket 11 with the battery modules 12 situated in the bracket 11 about a winding axis extending in the y-direction 18 of the electric vehicle 1, 2.

Figure 4:
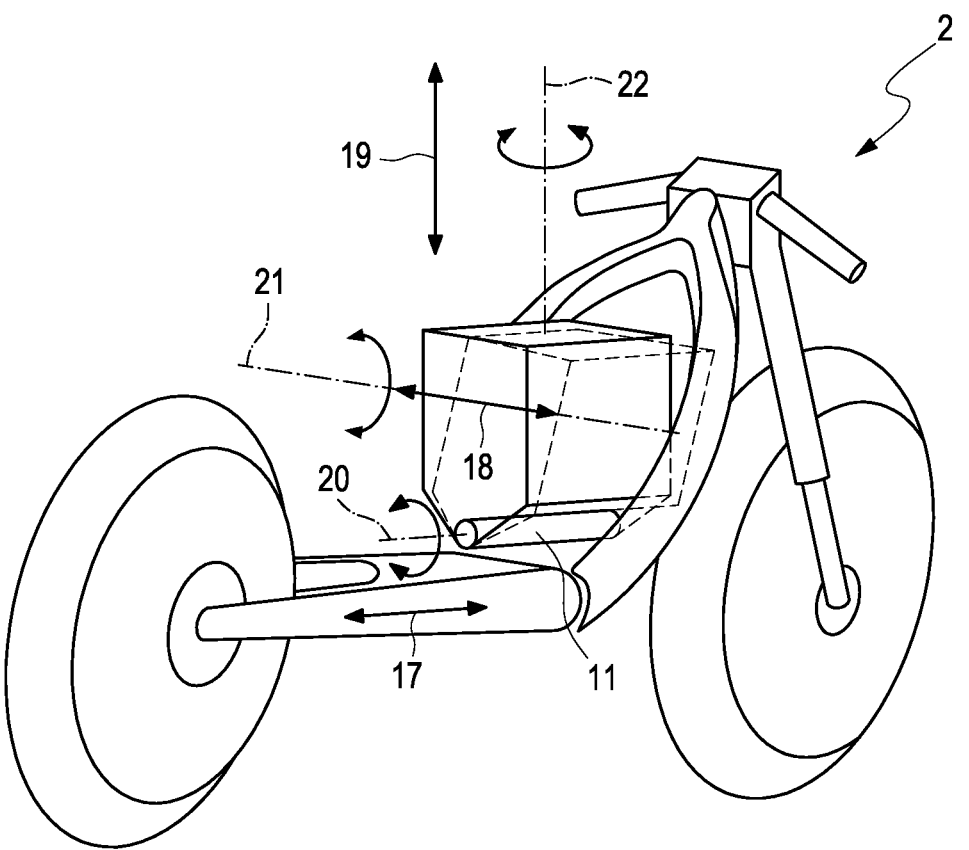
FIG. 4 shows in a perspective view, an electric vehicle according to a fourth embodiment of the disclosure.

FIG. 4 shows in a perspective view an electric vehicle 2 according to a fourth embodiment of the disclosure. The electric vehicle 2 of FIG. 4 is configured as a motorcycle. In the electric vehicle 2, the variable adjustment additionally involves a swiveling of the bracket 11 about an x-axis 20 extending in an x-direction 17 of the electric vehicle 1, 2, about a y-axis 21 extending in a y-direction 18 of the electric vehicle 1, 2, and/or about a z-axis 22 extending in a z-direction 19 of the electric vehicle 1, 2.

In the case of the electric vehicle 1 as shown in FIG. 1 being configured as a passenger car, the variable adjustment can also involve both a shifting of the bracket 11 and a swiveling of the bracket 11.

German patent application no. 10 2022 113197.1, filed May 25, 2022, to which this application claims priority, is hereby incorporated herein by reference in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for balancing an electric vehicle using a controller of the electric vehicle, the method comprising:
   variably adjusting the disposition of a bracket with battery modules of a traction battery of the electric vehicle situated in the bracket relative to a chassis of the electric vehicle;
   detecting, by a human-machine interface of the electric vehicle, an input of a passenger of the electric vehicle and sending a demand signal dependent on the detected input to the controller; and
   receiving, by the controller, the demand signal that was sent and adjusting the disposition of the bracket depending on the received demand signal,
   wherein variably adjusting the disposition of the bracket includes a first operation in which the entirety of the bracket and all battery modules situated therein are moved relative to the chassis, and
   wherein variably adjusting the disposition of the bracket includes winding up of the bracket with the battery modules situated in the bracket about a winding axis.

2. The method according to claim 1, wherein the human-machine interface detects the disposition as the input or wherein the human-machine interface detects a type of operation of the electric vehicle determining the disposition as the input.

3. The method according to claim 1, wherein the variable adjustment involves a shifting of the bracket in an x-direction of the electric vehicle, in a y-direction of the electric vehicle, and/or in a z-direction of the electric vehicle.

4. The method according to claim 1, wherein the variable adjustment involves a swiveling of the bracket about an x-axis extending in an x-direction of the electric vehicle, about a y-axis extending in a y-direction of the electric vehicle, and/or about a z-axis extending in a z-direction of the electric vehicle.

5. The method according to claim 1, the winding axis extends in the y-direction of the electric vehicle.

6. The method according to claim 1, wherein the controller activates an actuator and the activated actuator moves the bracket relative to the chassis.

7. The method according to claim 1, wherein the controller adjusts the disposition of the bracket depending on the acceleration of the electric vehicle and/or in order to influence a trajectory of the electric vehicle.

8. An electric vehicle, comprising:
   a chassis;
   a bracket mounted on the chassis and movable relative to the chassis;
   battery modules of a traction battery situated in the bracket;

a controller for variable adjusting of a disposition of the bracket relative to the chassis; and a human-machine interface functionally connected to the controller for detecting an input of a passenger of the electric vehicle and configured to carry out a method comprising:

variably adjusting the disposition of the bracket relative to the chassis by detecting, by the human-machine interface of the electric vehicle, the input of the passenger of the electric vehicle and sending a demand signal dependent on the detected input to the controller, and receiving, by the controller, the demand signal that was sent and adjusting the disposition of the bracket depending on the received demand signal, wherein variably adjusting the disposition of the bracket includes a first operation in which the entirety of the bracket and all battery modules situated therein are moved relative to the chassis, and wherein variably adjusting of the disposition of the bracket includes winding up of the bracket with the battery modules situated in the bracket about a winding axis.

9. The electric vehicle according to claim 8, being configured as a passenger car or a motorcycle.

10. The electric vehicle according to claim 8, wherein the human-machine interface is configured as an infotainment system of the electric vehicle or as a mobile terminal device connected to the electric vehicle.

* * * * *